United States Patent [19]

Matlock

[11] Patent Number: 4,513,900
[45] Date of Patent: Apr. 30, 1985

[54] WOOD CROSS-TIE END PLATING MACHINE

[76] Inventor: Gordon E. Matlock, 554 Sappington Bridge Rd., Sullivan, Mo. 63080

[21] Appl. No.: 553,779

[22] Filed: Nov. 21, 1983

[51] Int. Cl.³ .......................... A43D 71/00; B25C 7/00
[52] U.S. Cl. ........................................ 227/42; 227/41; 227/152; 227/153; 100/232
[58] Field of Search .................. 100/232; 227/5–7, 227/41, 42, 103, 106, 152, 153

[56] References Cited

U.S. PATENT DOCUMENTS

| 2,636,525 | 4/1953 | Anguera | 227/152 |
| 3,419,205 | 12/1968 | Jureit et al. | 227/152 |
| 3,540,107 | 11/1970 | Jureit et al. | 227/152 |
| 4,054,280 | 10/1977 | Alberts | 227/152 X |
| 4,351,465 | 9/1982 | Moehlenpah et al. | 227/7 |
| 4,365,734 | 12/1982 | Harris | 227/152 |
| 4,373,652 | 2/1983 | Matlock et al. | 227/152 X |

FOREIGN PATENT DOCUMENTS

| 0703327 | 12/1979 | U.S.S.R. | 227/152 |
| 0906692 | 2/1982 | U.S.S.R. | 227/41 |

Primary Examiner—Paul A. Bell
Assistant Examiner—Taylor J. Ross
Attorney, Agent, or Firm—Zarley, McKee, Thomte, Voorhees & Sease

[57] ABSTRACT

An end plating machine comprising a frame having an in-feed portion at one side thereof and an out-feed portion at the other side thereof. A stationary platen is provided at opposite ends of the frame below the in-feed and out-feed portions adapted to support the ends of a cross-tie delivered thereto. A conveyor delivers the cross-ties to the in-feed portion whereupon a tie transporter assembly moves the tie from the in-feed portion and delivers the tie to a tie elevator assembly which lowers the tie onto the stationary platens. A robotic claw assembly is provided above the stationary platen for squeezing the ends of the tie to close cracks therein. Each pair of robotic claws is operated by a single hydraulic cylinder. When the ends of the tie are squeezed together by the robotic claws, a hydraulic ram at opposite ends of the tie drives nail plates into the ends of the tie. After the plates have been driven into the tie, the robotic claws disengage from the tie and the tie is raised upwardly from the stationary platens to the out-feed portion. The cycle is then repeated.

6 Claims, 14 Drawing Figures

WOOD CROSS-TIE END PLATING MACHINE

BACKGROUND OF THE INVENTION

Cross-ties for use in the railroad industry are normally formed from green wood and frequently develop splits in the ends thereof during the seasoning process. It has been found desirable to close the splits or cracks in the ends of the tie and to maintain the same in that condition by means of nail plates, dowels, S-irons, etc. Many prior art devices have been provided for squeezing the ends of the tie together and then driving a nail plate into the end thereof but the prior art machines are extremely expensive and consume large amounts of energy.

In one of the prior art machines, the cross-ties, adjacent the ends, are squeezed, together by four or six hydraulic cylinders connected to movable platens. The requirement that two or three squeezing cylinders be provided at each end of the machine results in considerable expense and considerable energy being expended. Further, the prior art machines frequently require that the tie be lifted upwardly from a conveyor for the squeezing and plating operation. The requirement that the tie be lifted from a conveyor results in considerable super structure being needed to withstand the stresses and strains imposed on the machine during the squeezing and end plating operation.

Certain of the other prior art machines require that the cross-tie be slidably moved or positioned after the tie has been positioned in the machine so that the necessary squeezing and end plating operations may be performed. The sliding or positioning feature results in more time being consumed for the squeezing and plating operations.

It is therefore a principal object of the invention to provide a cross-tie end plating machine which is relatively less expensive to manufacture.

A further object of the invention is to provide a cross-tie end plating machine wherein the cross-tie, adjacent the ends thereof, is squeezed together by a single floating cylinder having robotic claws with platens secured thereto so that equalizing pressure is applied to all four sides of the tie.

Still another object of the invention is to provide a cross-tie end plating machine which achieves the squeezing and end plating operations at a higher rate of speed than prior art machines.

Yet another object of the invention is to provide a cross-tie end plating machine which is durable in use.

These and other objects will be apparent to those skilled in the art.

SUMMARY OF THE INVENTION

The apparatus of this invention comprises a frame means having an in-feed portion spaced from an out-feed portion with a pair of horizontally spaced stationary platens positioned therebetween and therebelow. A conveyor means delivers the cross-ties to the in-feed portion so that the apparatus will successively handle the ties. A tie elevator assembly and a tie transporter assembly are mounted on the frame means and are designed to move the ties from the in-feed portion to the stationary platens and thus upwardly to the out-feed portion after the tie has been squeezed and end plated. When the tie is resting on the stationary platens, a robotic claw assembly squeezes the tie, adjacent the ends thereof, to compress any cracks present therein. A power ram drives the nail plates into the ends of the tie as the tie is being squeezed. After the plates have been driven into the ends of the tie, the robotic claws move out of engagement with the tie and the power ram retracts. The tie elevator assembly and tie transporter assembly then move upwardly so that a tip riser stop assembly mounted on the tie transporter assembly lifts the tie upwardly to the plane of the out-feed portion. The tie then rolls outwardly on the out-feed portion. The cycle is then repeated.

DESCRIPTION OF THE PREFERRED EMBODIMENT

The end plating of this invention is referred to generally by the reference numeral 10 including a frame means 12 including a base portion 14, end frames 16 and 18, and upper frame 20 which extends between the upper ends of the end frames 16 and 18. Inasmuch as each of the end frames 16 and 18 are identical, only end frame 16 will be described in detail.

Figure 1:
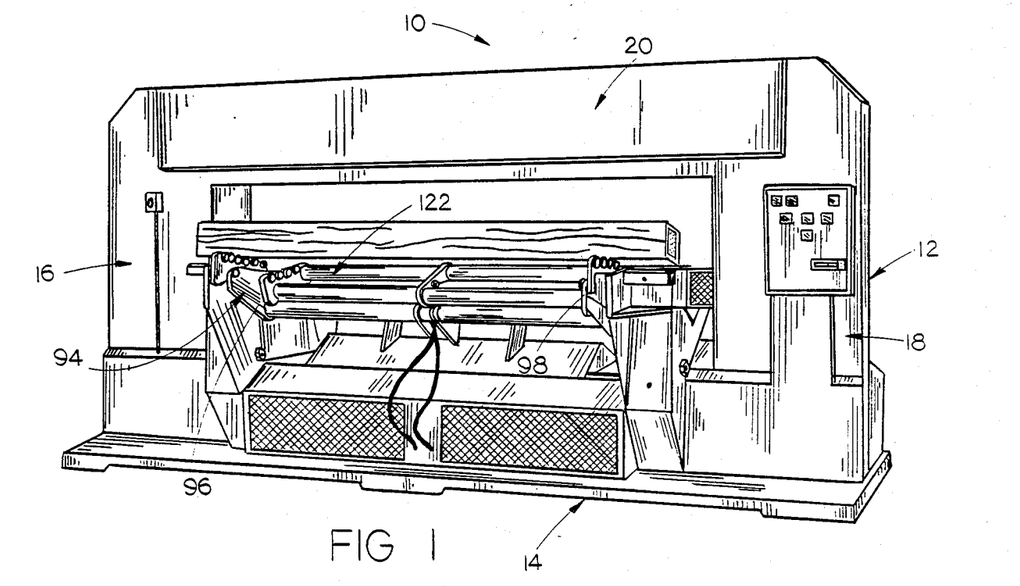
FIG. 1 is a perspective view of the end plating machine of this invention.
Figure 2:
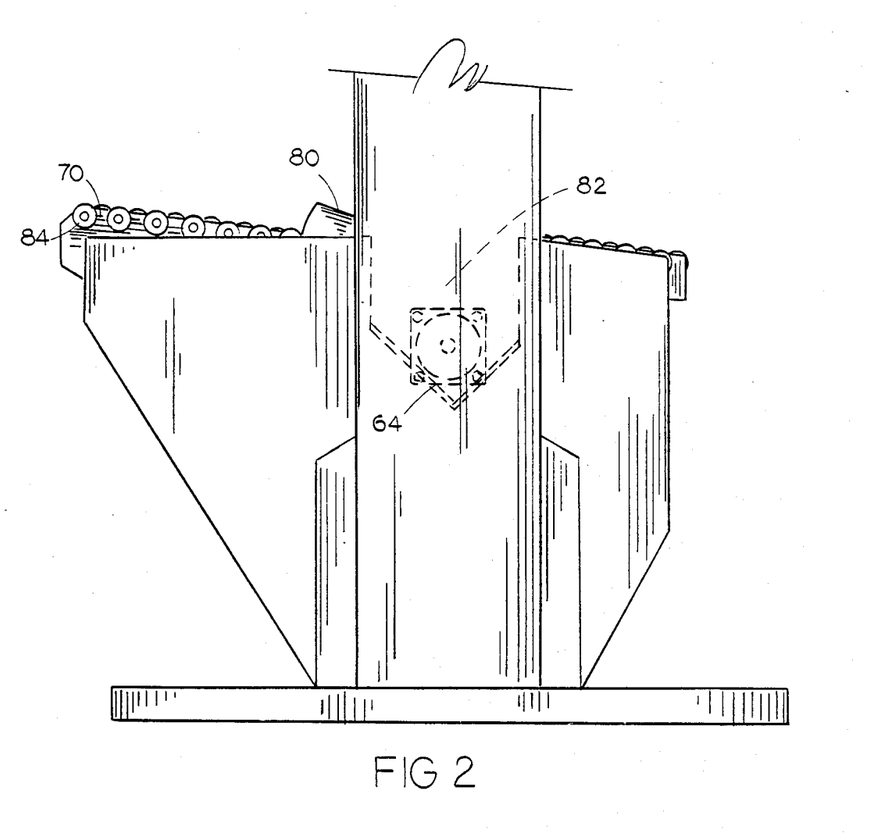
FIG. 2 is a partial end elevational view of the machine as seen from the right of FIG. 1.
Figure 3:
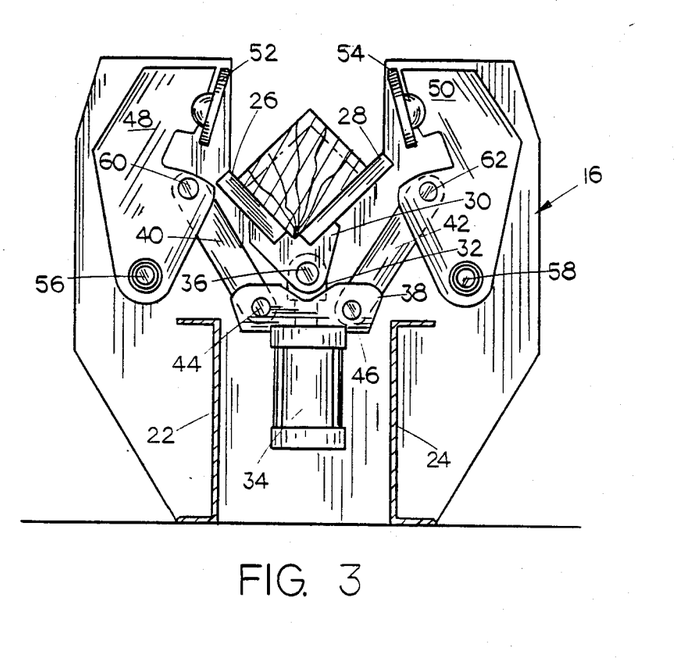
FIG. 3 is a vertical sectional view illustrating the robotic claws about to squeeze a cross-tie.
Figure 4:
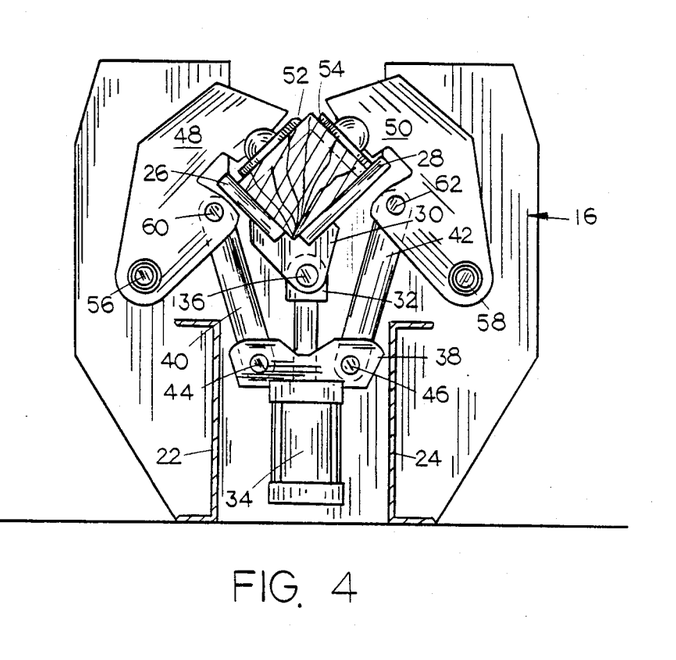
FIG. 4 is a view similar to FIG. 3 except that the robotic claws have moved into squeezing position.
Figure 5:
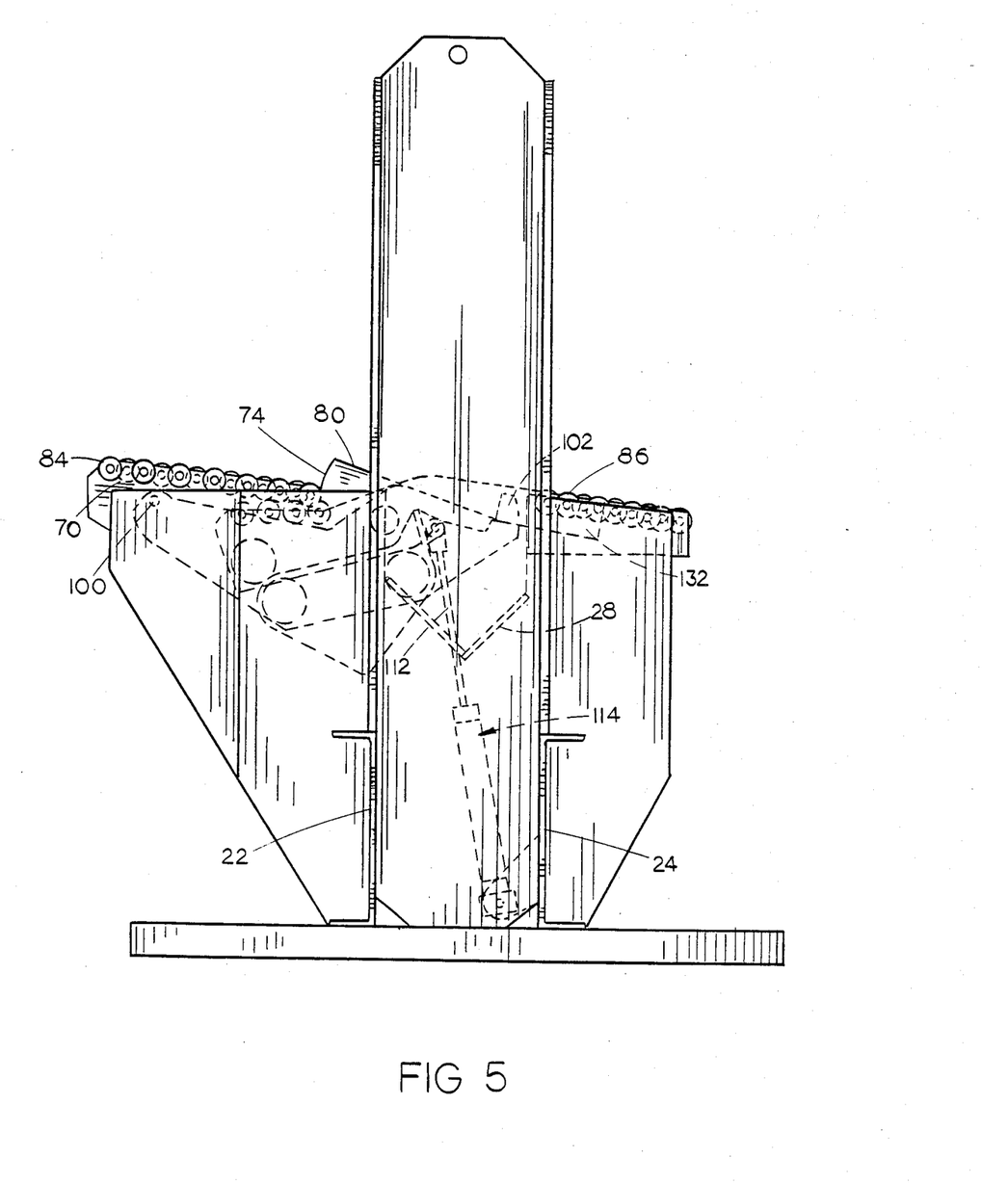
FIG. 5 is a partial end elevational view illustrating the relationship of the in-feed table, out-feed table, tie transporter and tie elevator assemblies.

As seen in FIGS. 3 and 4, a pair of spaced-apart beams 22 and 24 extend through base portion 14 and interconnect the end frames. Tie squeezing stations are provided at each end of the machine for squeezing the cross-ties adjacent the ends thereof. Inasmuch as the tie squeezing stations are identical, only one of the stations will be described in detail. Each end of end frame 16 is provided with a pair of inclined stationary platens 26 and 28 which are disposed at 45° angles from horizontal as seen in FIGS. 3 and 4. Bracket 30 is connected to platens 26 and 28 and extends downwardly therefrom.

The rod 32 of cylinder 34 is pivotally connected to the lower end of bracket 30 at 36. Plate 38 is secured to the body of the cylinder 34 and has a pair of links 40 and 42 pivotally connected thereto at 44 and 46 respectively. The upper ends of links 40 and 42 are pivotally connected to movable platen supports 48 and 50 having platens 52 and 54 mounted thereon in a swivel fashion such as in my co-pending application, now U.S. Pat. No. 4,494,685. Supports 48 and 50 are pivotally connected to the end frame 16 at 56 and 58 respectively. The links 40 and 42 are pivotally connected to the supports 48 and 50 at 60 and 62. FIG. 3 illustrates the rod 32 in its retracted position while FIG. 4 illustrates the rod 32 in an extended position. Extension of the rod 32 causes the cylinder 34 to move downwardly relative to bracket 30 thereby causing the supports 48 and 50 to pivotally move inwardly so that the platens 52 and 54 squeeze the tie. The pivotal connection of the cylinder with the bracket 30 and the supports 48 and 50 provides a free-floating effect so that the platens will seek out the surfaces of the tie and will adjust to the tie regardless of the dimensions of the tie thereby permitting the apparatus to accommodate various tie sizes. More specifically, the extension of the rod 32 causes downward pressure, in a straight line, to be exerted on the tie. The straight line forces result in the pressure being equalized on all four sides of the tie.

Figure 6:
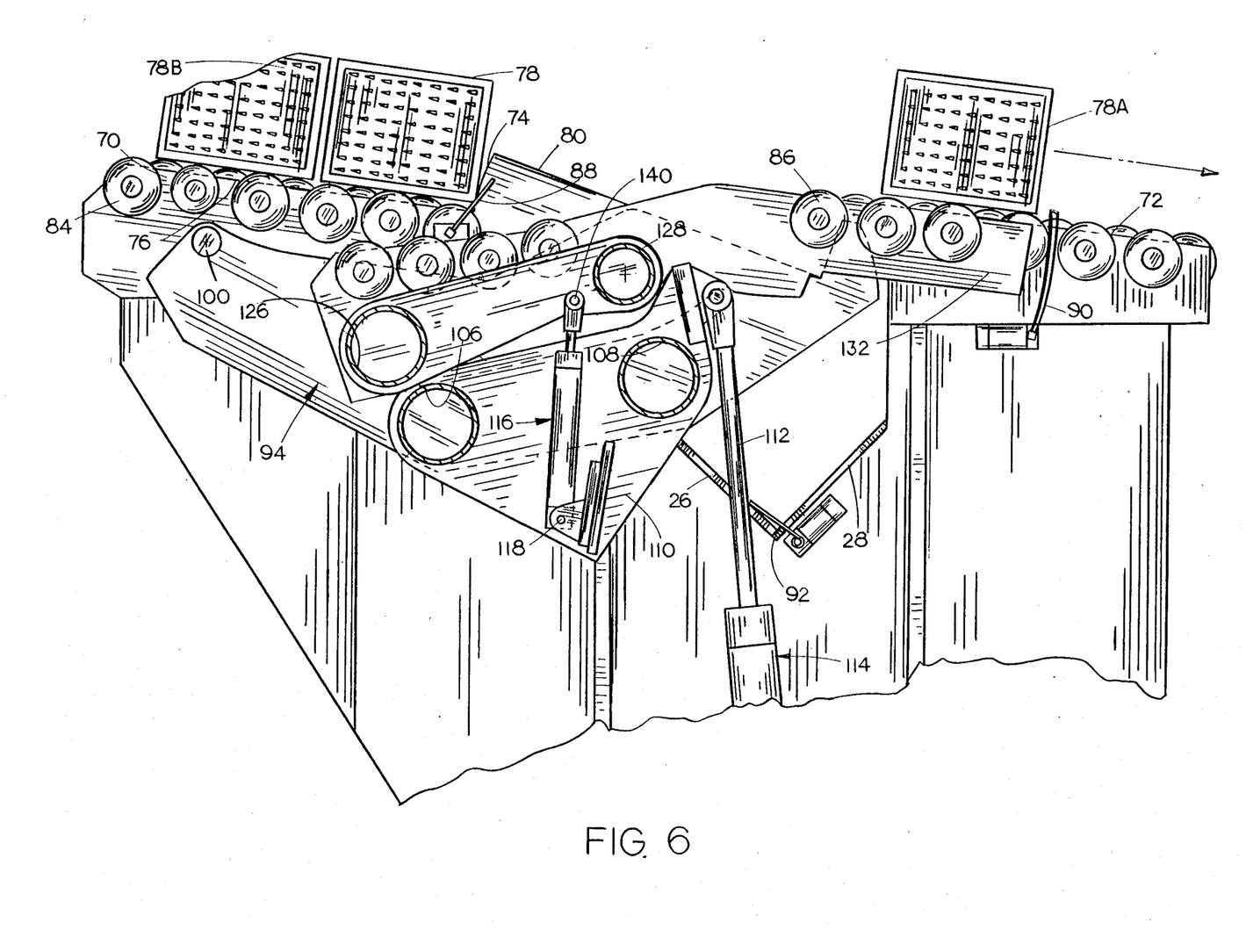
FIG. 6 is a partial end elevational view illustrating the tie transporter and tie elevator assemblies in a first position.

Power rams 64 and 66 are mounted in the end frames 16 and 18 and are adapted to be extended to drive the nailing plates into the ends of the tie when the ends have been squeezed or compressed by the platens 52 and 54. Each of the end frames 16 and 18 include in-feed portions 70 and out-feed portions 72. As seen in FIG. 6, each of the in-feed portions 70 is provided with an abutment 74 which extends upwardly from surface 76 to limit the inward movement of the innermost tie referred to generally by the reference numeral 78. Surface 80 extends from the upper end of abutment 74 inwardly into the throat or opening in the end frame which is generally identified by the reference numeral 82. Rollers 84 are provided on the in-feed portion to aid in movement of the ties. Likewise, rollers 86 are provided on the out-feed portion 72 to aid in conveying the tie 78 after it has been plated. The numeral 88 refers to a sensor switch positioned adjacent abutment 74 while the numeral 90 refers to a sensor switch which is positioned adjacent the out-feed portion 72 as seen in the drawings. The numeral 92 refers to a sensor switch located adjacent the platens 26 and 28. Switch 88 senses when a tie has moved into position against the abutment 74 while sensor 90 senses when a tie has rolled across out-feed portion 72. Switch 92 senses when a tie has been positioned on the platens 26 and 28.

Tie elevator assembly 94 is positioned between the end frames 16 and 18 and includes end portions 96 and 98 which are pivotally connected to end frames 16 and 18. Inasmuch as the plates 96 and 98 are identical, only plate 98 and its associated structure will be described. Plate 96 is pivotally connected to end frame 16 at 100 and includes a tie engaging portion 102 at its inner end. For purposes of description, plate 96 will be described as having surface 104 positioned adjacent the portion 102. Tubes 106 and 108 are secured to the plates 96 and 98 and extend therebetween. Bracket 110 is secured to the tubes 106 and 108 at their center length and has rod 112 of cylinder 114 pivotally connected thereto. Cylinder 116 is pivotally connected at its base end to plate 110 at 118 and has rod 120 extending therefrom.

Tie transporter assembly 122 is pivotally mounted on the tie elevator assembly and includes identical end plates 124 connected together by tubes 126 and 128. End plate 124 is pivotally connected intermediate its length to the plates 96 and 98 by tube 128 to define outer and inner end portions 130 and 132 respectively. Rollers 134 are mounted on the plate 124 adjacent outer end 130 while rollers 136 are mounted thereon adjacent inner end 132. Plate or bracket 138 is secured to the tubes 126 and 128 at the center length thereof and has rod 120 of cylinder 116 pivotally connected thereto at 140.

Figure 12:
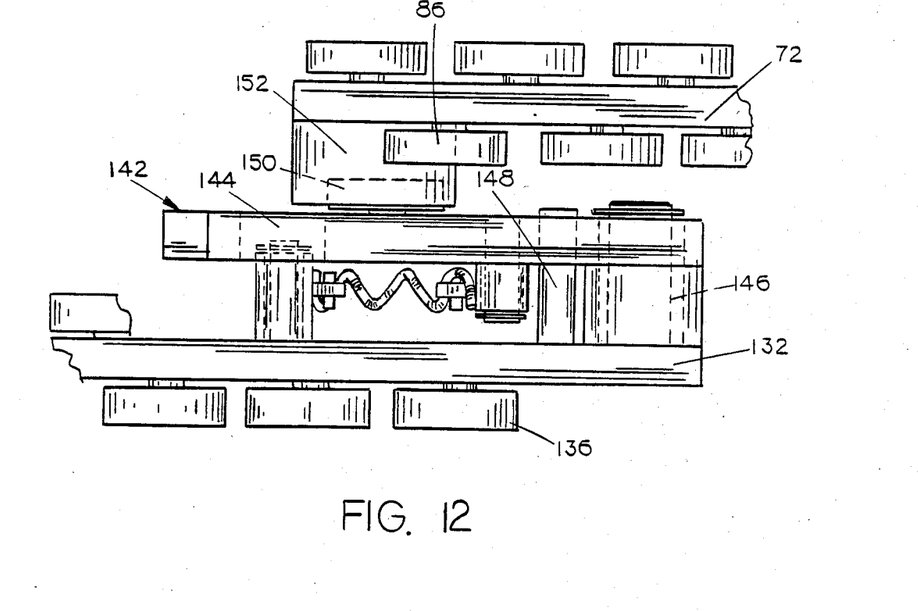
FIG. 12 is a partial top elevational view illustrating the tie riser position stop assembly.
Figure 13:
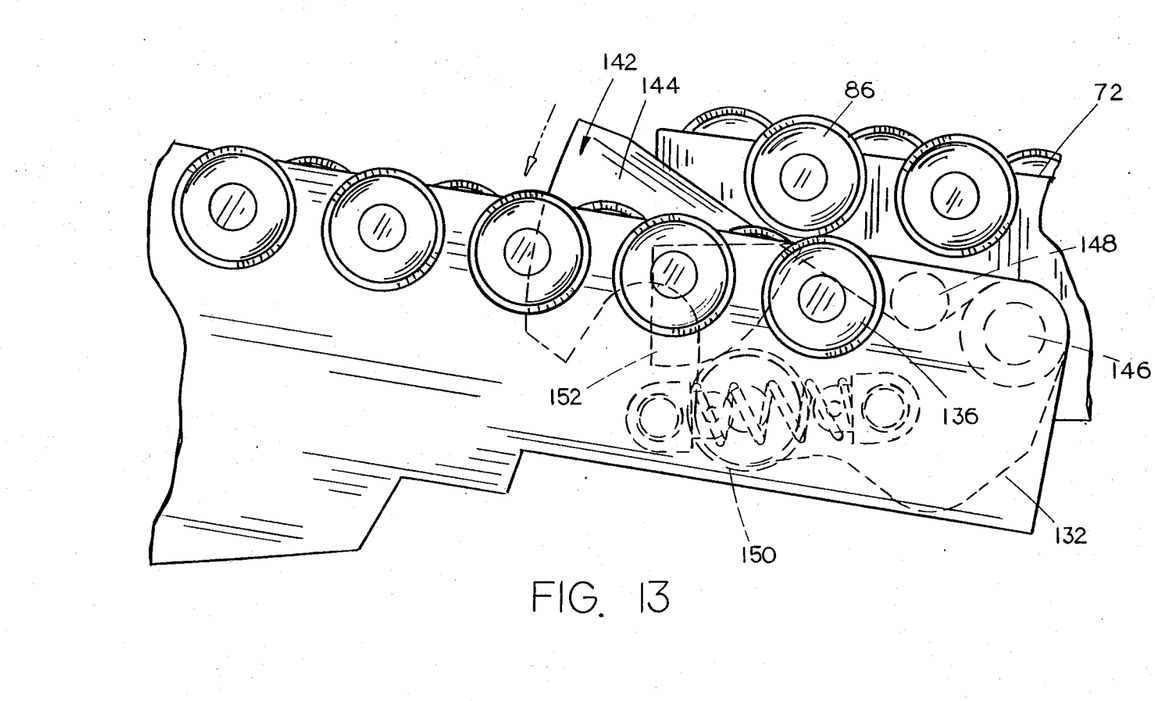
FIG. 13 is a partial side elevational view also illustrating the tie riser stop assembly.

A tie riser position stop assembly 142 is mounted on the inner portion 132 of each of the plates 124. Assembly 142 includes a plate 144 pivotally connected to inner end portion 132 of plate 124 at 146. Pin 148 extends outwardly from plate 124 to limit the upward pivotal movement of the plate 144 relative to the plate 124. Plate 144 is urged to its upper position by means of a spring 145 connected thereto. Roller 150 is mounted on the outer side of plate 144 and is adapted to engage the cam 152 mounted on end portion 16 adjacent the inner end of out-feed portion 72 to cause the plate 144 to pivot downwardly relative to plate 124 as the plate 124 is pivotally moved upwardly as will be described in more detail hereinafter.

Figure 7:
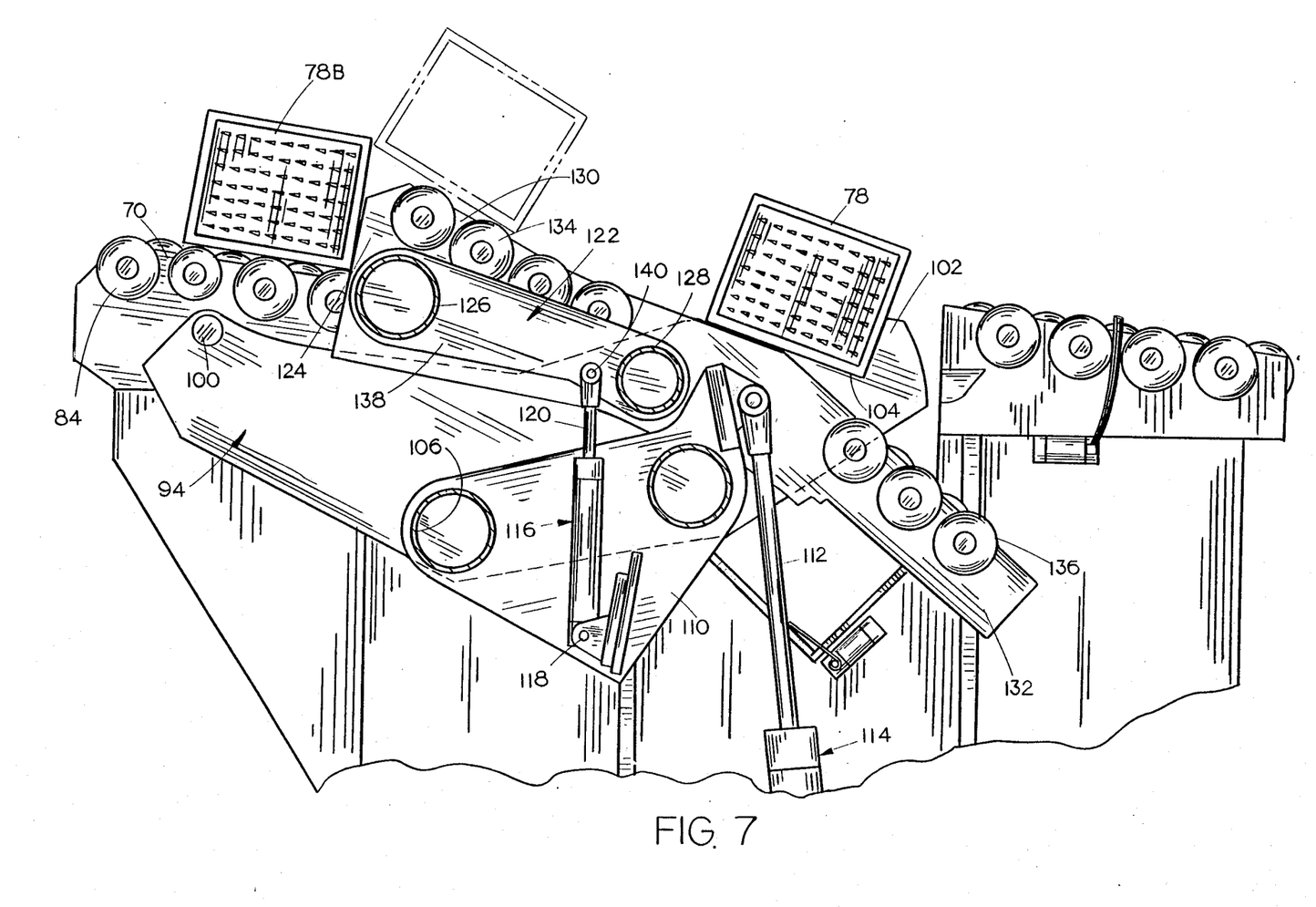
FIG. 7 is a view similar to FIG. 6 except that the tie transporter assembly has pivotally moved upwardly to move a tie downwardly onto the tie elevator assembly.

In operation, FIG. 6 illustrates the tie transporter assembly 122 in the position at the end of the cycle so that the end plated tie 78a is moving along the out-feed portion 72. FIG. 6 also illustrates a pair of ties 78 and 78b in position on the in-feed portion 70. Sensor switch 88 senses that tie 78 is in position and causes the cylinder 116 to be extended so that the tie transporter assembly pivotally moves from the position of FIG. 6 to the position of FIG. 7. The extension of rod 120 causes the outer end 124 of tie transporter assembly 122 to pivotally move upwardly thereby causing the tie 78 to be moved upwardly above the abutment 74 and to roll downwardly on the tie transporter assembly 122 until the tie 78 engages the tie engaging portion 102 on the tie elevator assembly 94. The sequence of operation occurs after the sensor switch 90 has sensed that the tie 78a has rolled thereby. As seen in FIG. 7, the outer end of the tie transporter assembly 122 engages the inner end of the tie 78b to limit its inward movement.

Figure 8:
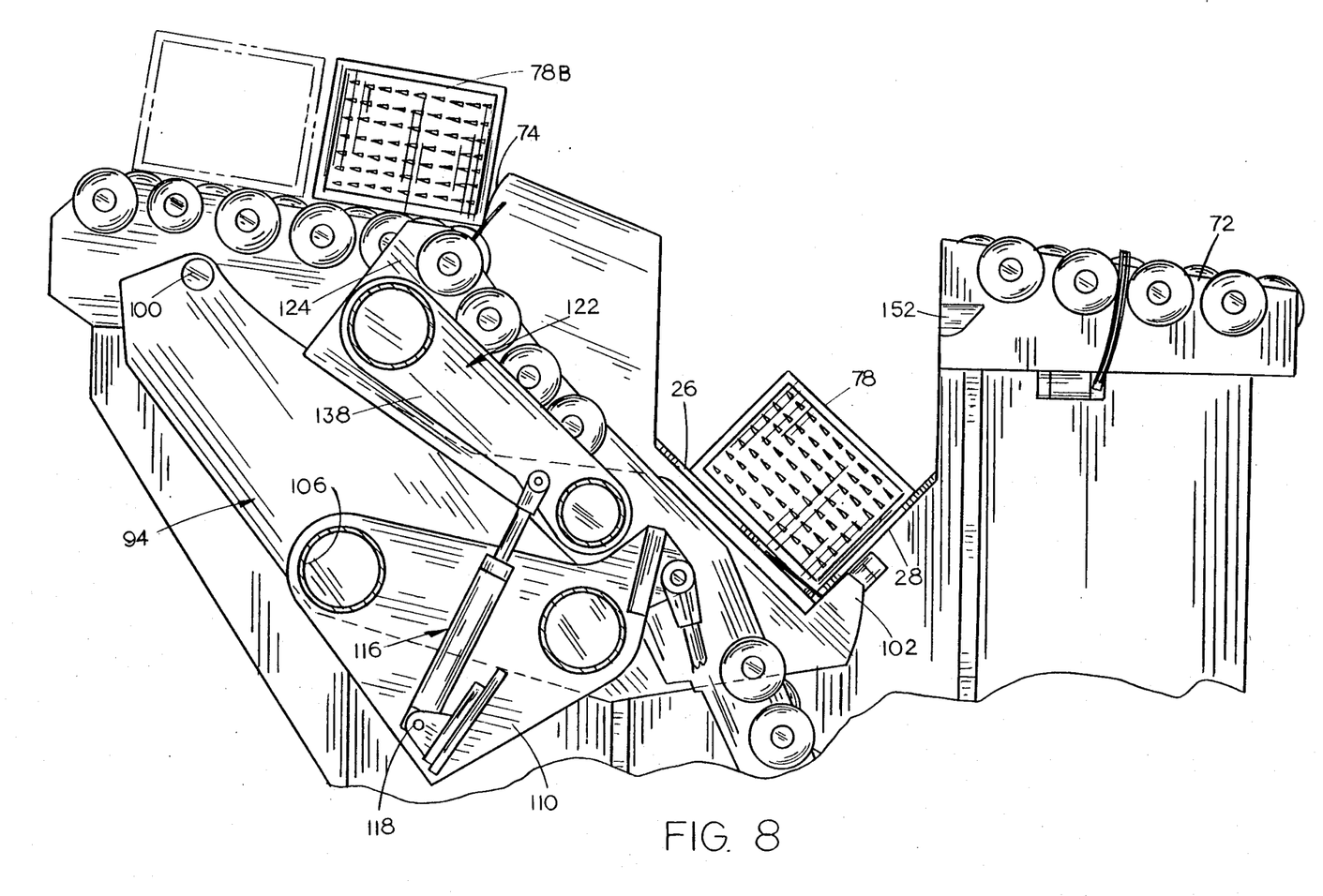
FIG. 8 is a view similar to FIGS. 6 and 7 except that the tie elevator assembly has lowered the tie onto the stationary platens.
Figure 9:
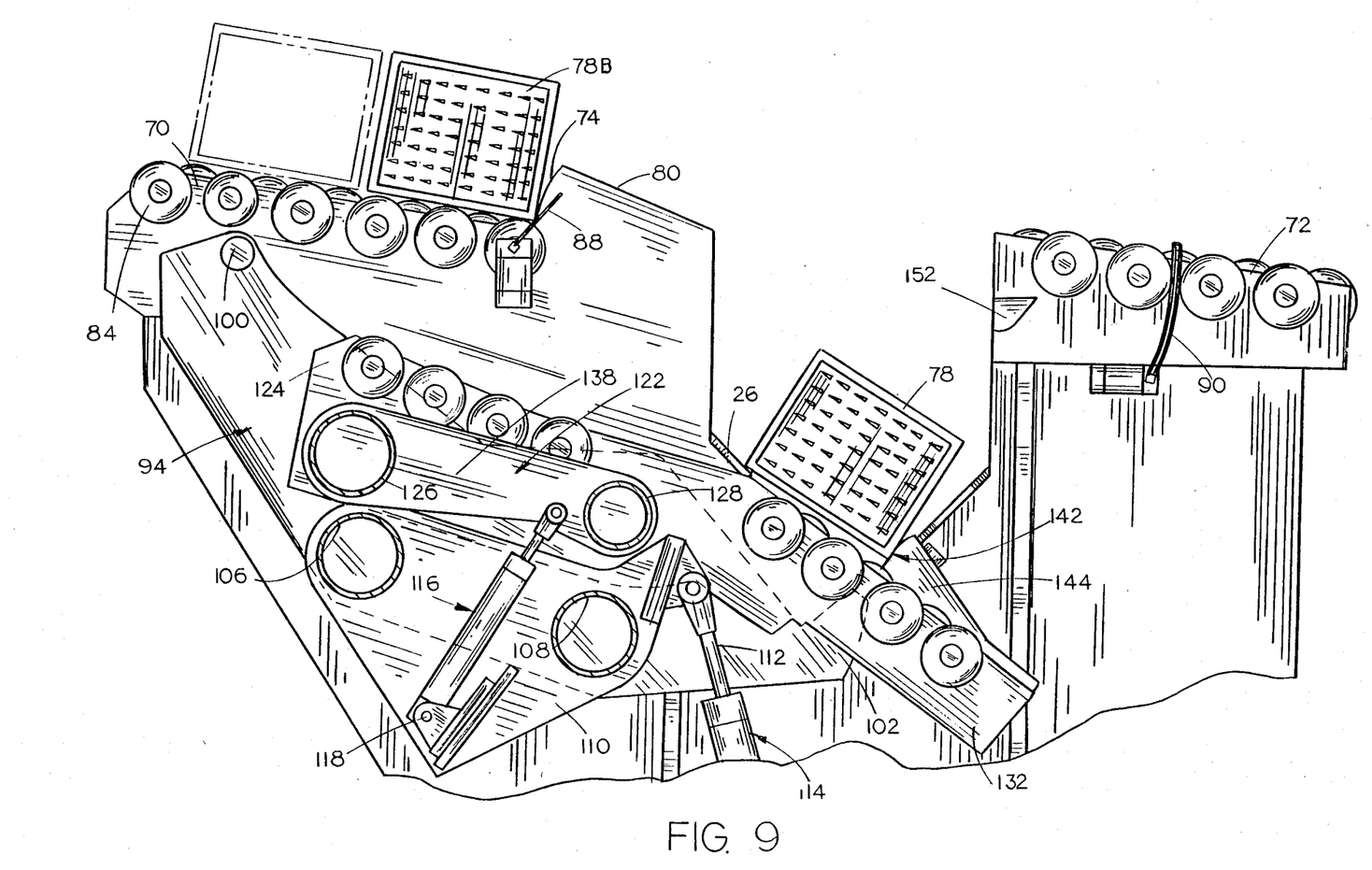
FIG. 9 is a view similar to FIG. 8 illustrating the tie being lifted upwardly out of the stationary platens.
Figure 10:
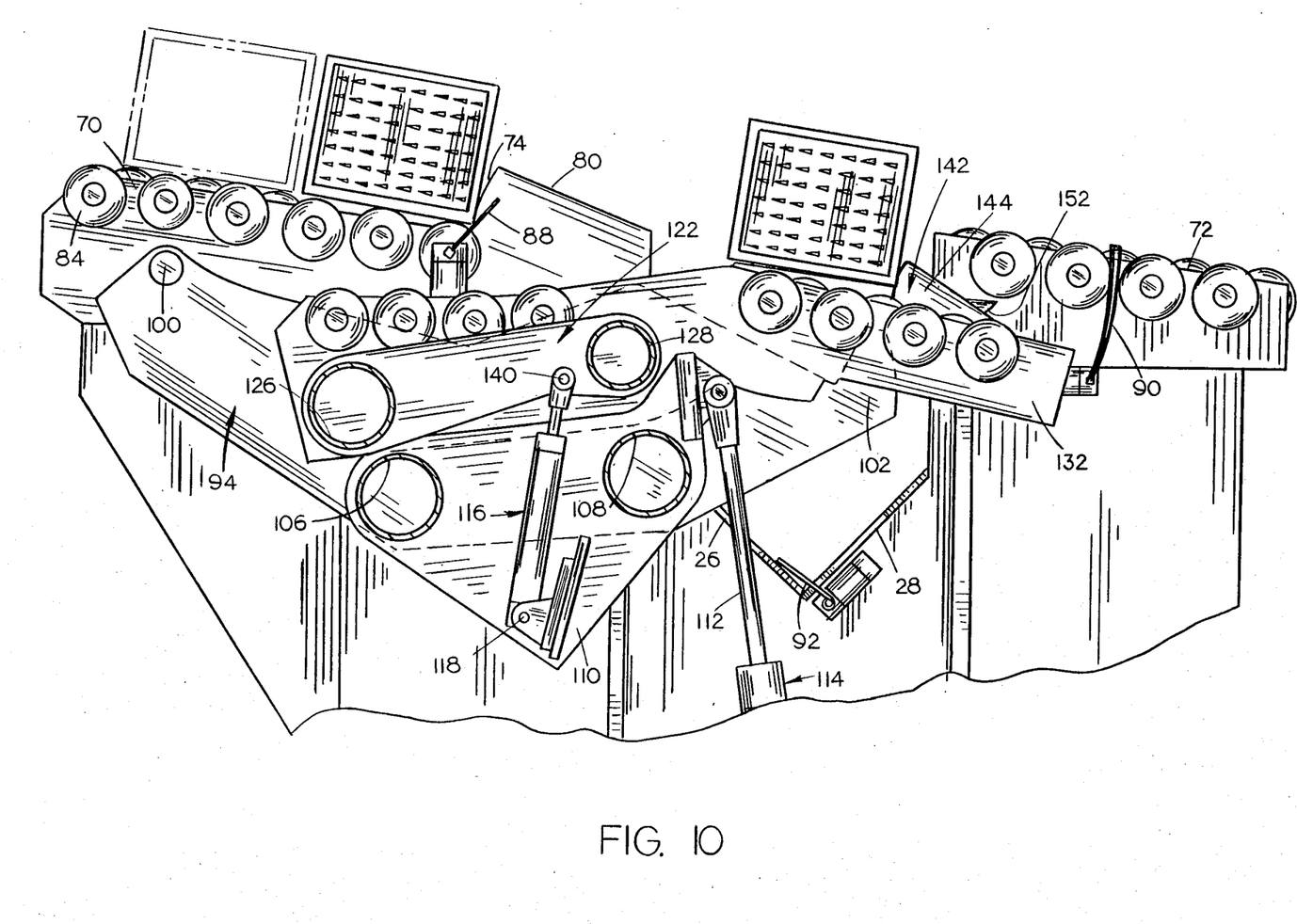
FIG. 10 is a view similar to FIG. 9 showing the tie being lifted upwardly towards the out-feed table.
Figure 11:
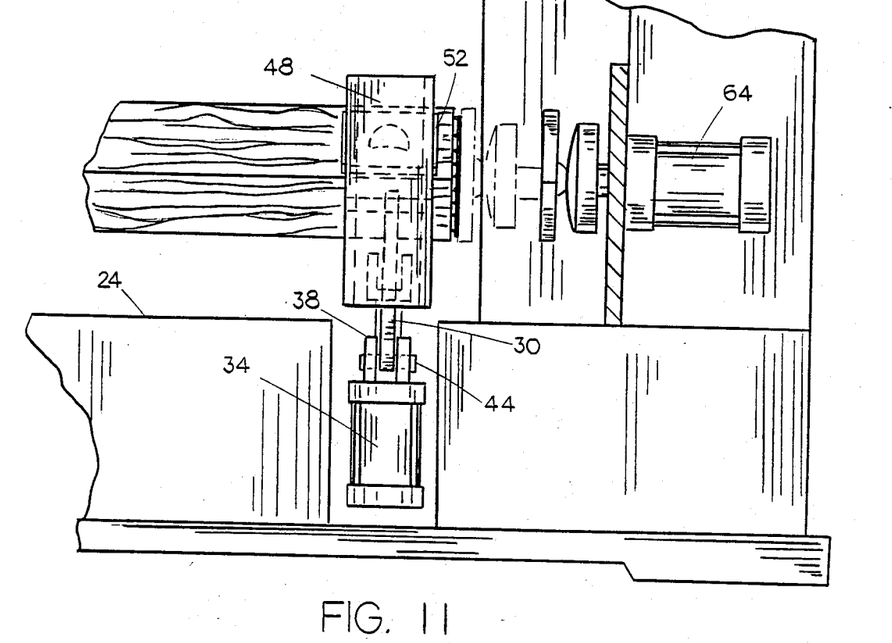
FIG. 11 is a sectional view illustrating an end plating cylinder and platen.

Cylinder 114 is then retracted which causes the tie elevator assembly 94 to pivot downwardly about 100 so that the tie 78 is lowered onto the stationary platens 26 and 28 as illustrated in FIG. 8. As the tie 78 is lowered onto the platens 26 and 28, tie 78b rolls inwardly until it engages the abutment 74.

The cylinders 34 are then actuated to cause the extension of the rod therefrom which causes the platen supports or claws 48 and 50 to pivotally move inwardly so that the platens 52 and 54 engage the upper surfaces of the tie which is dwelling at a 45° position as illustrated in FIG. 4. The cylinder 34 is "free-floating" due to the pivotal connection between it and the bracket 30 and the claws 48 and 50 so that the platens 52 and 54 seek out the surfaces of the tie and to adjust to the same. The free-floating mounting of the cylinder provides a self-contained assembly for squeezing the tie and permits the claws to apply equal pressure to the tie regardless of any irregularities on the tie surface or variations in the tie width or thickness. The mounting of the robotic claws also permits the apparatus to accommodate various size ties.

While the ends of the tie are being squeezed by the robotic claws, the power rams are actuated to drive the nail plates into the ends of the tie. The power rams are then retracted and the robotic claws released from the tie.

Cylinder 114 is then extended so that the inner end of the tie elevator assembly 94 is pivotally moved upwardly. As the inner end of the tie elevator assembly 94 moves upwardly, the tie transporter assembly 22 also moves upwardly therewith. The end of the plates 144 engage the tie and lift the tie upwardly out of the stationary platen. As the tie transporter assembly 122 moves upwardly, roller 150 engages the underside of cam 152 which causes the plate 144 to pivotally move downwardly out of engagement with the tie. The plate 144 moves out of engagement with the tie when the tie reaches the plane of the out-feed portion of the machine so that the tie rolls outwardly on the out-feed portion to a conveyor which conveys the tie to the desired location. FIG. 6 illustrates the tie rolling outwardly on the out-feed portion 76. The sequence is now complete and is then repeated. The tie moving on the out-feed portion 78 engages the sensor switch 90 to signal the control mechanism that the sequence should be repeated.

Thus it can be seen that a novel end plating apparatus has been provided which permits the rapid handling of ties in successive fashion. The fact that the ties are dropped downwardly into stationary platens between the in-feed and out-feed portions of the machine eliminates the need for costly super-structure or frames normally associated with those types of machines which elevate the tie into the stationary platens. The robotic claws at each end of the tie permit the tie to be properly squeezed so that the cracks in the end of the tie are properly closed so that the end plates, after being driven thereinto, will maintain the cracks in the tie in a closed condition. The fact that the ties are squeezed by a single cylinder at each end of the tie substantially reduces the cost of the machine and results in less hydraulic energy being expended than in those machines which have six to eight cylinders required for squeezing the ends of the tie.

Figure 14:
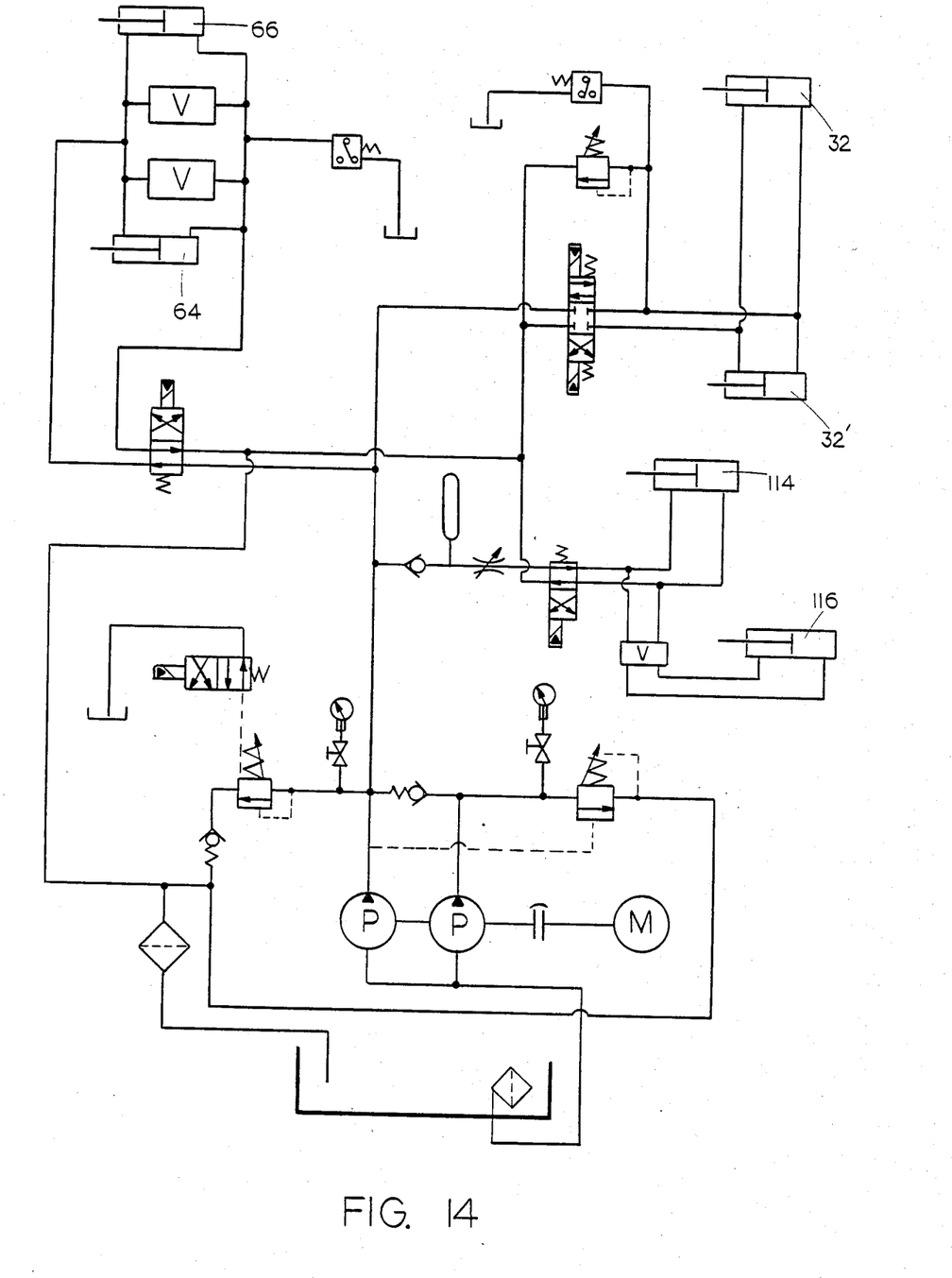
FIG. 14 is a schematic view of the hydraulic circuitry of the invention.

The hydraulic circuitry illustrated in FIG. 14 is believed to be self-explanatory and will not be described in detail for purposes of conciseness. Although the hydraulic circuitry illustrated in FIG. 14 is the circuitry which accomplishes the desired end results, certain modifications in the circuitry may be accomplished without departing from the spirit of the invention.

It can be seen from the foregoing that the end plating machine of this invention accomplishes at least all of its stated objectives.

I claim:

1. An end plating machine for wood cross ties, comprising,
    a frame means including horizontally spaced-apart end frames,
    each of said end frames having spaced-apart cross tie in-feed and out-feed portions,
    each of said end frames having stop means thereon adjacent the inner ends of said in-feed portions for limiting the inward movement of said ties on said in-feed portions,
    said in-feed portions adapted to receive the ends of at least one cross tie,
    a first stationary platen means on one of said end frames,
    a second stationary platen means on the other of said end frames,
    said stationary platens adapted to support the ends of a cross tie thereon,
    a first pair of movable platens on said one end frame,
    a second pair of movable platens on the other of said end frames,
    hydraulic cylinder means connected to each of said first and second pairs of movable platens for moving said movable platens toward said stationary platens for squeezing the ends of the cross tie positioned on said stationary platens,
    a power ram means on each of said end frames for driving end plates into the ends of the cross tie,
    a tie elevator assembly positioned between said end frames and having inner and outer ends, the outer end of said tie elevator assembly being pivotally connected, about a horizontal axis, to said end frames,
    a first power cylinder connected to said tie elevator assembly for raising and lowering the inner end of said tie elevator assembly relative to said end frames,
    a tie transporter assembly having inner and outer ends, said tie transporter assembly being pivotally connected, about a horizontal axis, intermediate the inner and outer ends thereof, to said tie elevator assembly, intermediate the inner and outer ends thereof,
    a second power cylinder connected to said tie transporter assembly for pivotally raising and lowering the inner and outer ends of said tie transporter assembly relative to said tie elevator assembly,
    control means for:
        (a) extending said second power cylinder thereby causing the outer end of said tie transporter assembly to pivotally move upwardly to engage the innermost cross tie on said in-feed portion and to raise said innermost tie above said stop means so that said cross tie can move inwardly onto said tie elevator assembly;
        (b) retracting said first power cylinder thereby causing said tie elevator assembly to pivotally move downwardly so that the tie is lowered onto the stationary platens;
        (c) operating said hydraulic cylinder means to cause said movable platens to compress the ends of the cross tie;
        (d) activating said power ram means to force the end plates into the ends of the cross tie;
        (e) retracting said power ram means;
        (f) operating said hydraulic cylinder means thereby moving the movable platens out of engagement with the cross tie;
        (g) extending said first cylinder and retracting said second cylinder thereby causing the cross tie to be lifted upwardly out of the stationary platens and be delivered to the out-feed portions.

2. The machine of claim 1 wherein said hydraulic cylinder means connected to said first and second pairs of movable platens comprises a single hydraulic cylinder connected to each of said pairs, said stationary platens dwelling in a plane disposed at approximately a 45° angle with respect to horizontal.

3. The machine of claim 2 wherein said single hydraulic cylinder is positioned below one of the pairs of stationary platens and has its rod operatively pivotally connected thereto, the extension and retraction of said rod causing the body of said hydraulic cylinder to move downwardly and upwardly respectively with respect to the associated end frame and pair of stationary platens, first links pivotally connecting said cylinder body to said movable platens.

4. The machine of claim 1 wherein a tie riser position stop assembly is mounted on the inner end of the transporter assembly for engagement with the tie positioned on the stationary platens for moving said tie upwardly towards the said out-feed portions.

5. The machine of claim 1 wherein said stop means comprises an abutment means extending upwardly from the inner end of said in-feed portions.

6. The machine of claim 5 wherein said in-feed portions are adapted to accommodate a plurality of crossties thereon and wherein the outer end of said tie transporter assembly engages the inner end of the second tie on the in-feed portions to limit the inward movement thereof as the tie transporter assembly raises the first tie above said abutment means.

* * * * *